Oct. 28, 1958 R. C. KENNEDY 2,858,368

COLOR TELEVISION TEST APPARATUS

Filed March 25, 1957 5 Sheets-Sheet 1

INVENTOR.
RALPH C. KENNEDY

BY [signature]

ATTORNEY

Oct. 28, 1958 R. C. KENNEDY 2,858,368

COLOR TELEVISION TEST APPARATUS

Filed March 25, 1957 5 Sheets-Sheet 2

INVENTOR
RALPH C. KENNEDY
BY [signature]
ATTORNEY

Oct. 28, 1958　　R. C. KENNEDY　　2,858,368

COLOR TELEVISION TEST APPARATUS

Filed March 25, 1957　　5 Sheets-Sheet 3

INVENTOR
RALPH C. KENNEDY
BY [signature]
ATTORNEY

Oct. 28, 1958 R. C. KENNEDY 2,858,368

COLOR TELEVISION TEST APPARATUS

Filed March 25, 1957 5 Sheets-Sheet 4

INVENTOR
RALPH C. KENNEDY
BY [signature]
ATTORNEY

Oct. 28, 1958 R. C. KENNEDY 2,858,368

COLOR TELEVISION TEST APPARATUS

Filed March 25, 1957 5 Sheets-Sheet 5

INVENTOR.
RALPH C. KENNEDY
BY [signature]
ATTORNEY 2,858,368
Patented Oct. 28, 1958

2,858,368

COLOR TELEVISION TEST APPARATUS

Ralph C. Kennedy, Jamaica Estates, N. Y., assignor to Radio Corporation of America, a corporation of Delaware Application March 25, 1957, Serial No. 648,316

8 Claims. (Cl. 178—5.4)

The present invention relates to television test apparatus and, particularly, to apparatus useful in testing color television signal processing and transmitting circuits.

Present-day television systems include many varied types of circuits in the overall communications link between the television studio camera and the receiver in the field, including distribution and switching circuits, transmission lines and the like. It is, moreover, well known that each of the various elements of the communications link may have a degrading influence upon the signal being processed. In order that the types of degradation which may result may be better understood, an appreciation of the form of broadcast color television signal is required. As is known, color television signals of the type standardized by the Federal Communications Commission on December 17, 1953, result from the scansion of an object in a line-by-line and field-by-field manner by one or more camera pick-up devices responsive to preselected component colors of the object being televised. The composite signal produced for transmission involves line- and field-synchronizing pulses, blanking pedestals upon which the synchronizing pulses are superimposed, a luminance or brightness component in the form of an amplitude-modulated wave indicative of the brightness of elemental areas of the object, as determined in the line-by-line scansion, and a color or chrominance component. The chrominance component may be viewed simply as being a color subcarrier wave of 3.58 mc. lying near one end of the normal video passband, which wave is phase- and amplitude-modulated in accordance with the hue and saturation of the object. In order that receiver circuits may effect detection of the information thus borne by the color subcarrier wave, standard practice involves the transmission, during each horizontal blanking interval, of a color synchronizing burst comprising a relatively small number (e. g., 8 or 9) of cycles of subcarrier wave of reference frequency and phase.

A major difficulty presented in connection with the successful transmission of a composite color television signal is that its various components are subject to distortion in transmission, such that no true reference components are possessed by the signal after passage through the various elements of the transmission link. For example, the "blacker-than-black" synchronizing pulses are often subjected to amplitude alteration or distortion resulting from clamp circuits which clip the tips of the sync pulses and amplifier circuits which tend to compress the sync pulses. Blanking pedestals are also subject to undesirable distortion, so that their utility in level-setting is greatly diminished. Moreover, since many televised images do not have any white image content, it has been found to be impracticable to determine signal levels from white-representative portions of the signal. Thus, it will be appreciated that the usual television signal, per se, affords no real references by which the amplitude distortion effects of the transmission link may be determined.

Insofar as the chrominance component of the signal is concerned, it has been found that the color synchronizing bursts and the chrominance signal itself are also subject to undesirable distortion in transmission and processing. For example, amplifiers which tend to compress synchronizing pulses also may produce compression of the negative-going half-cycles of the color bursts. Also, the frequency response of many circuits is such that signal frequencies in the region of the color subcarrier may be peaked or attenuated, with resultant increase or decrease of burst amplitude. Additionally, the shape of each burst may be so altered that its outline resembles a football, rather than a well defined, generally rectangular envelope. It is thus apparent that neither the luminance nor chrominance portion of a broadcast color television signal affords a reference level useful in determining the performance of the transmission system during normal operation.

It is, therefore, an object of the present invention to provide novel apparatus useful in conjunction with television broadcast facilities for enabling the performance of the facilities to be evaluated in operation.

Another object of the invention is that of providing novel apparatus for producing a test signal wave capable of transmission along with a standard broadcast television signal, which wave affords various references for use in evaluating system performance.

In general, the present invention comprises means for producing a test signal wave including pedestals of reference amplitude and bursts of color subcarrier energy suitable for transmission during the vertical blanking interval of the transmitted television signal. In accordance with a specific form of the invention, means are provided for producing, during a given number of lines occurring within each vertical or field blanking period, a test signal wave including a plurality of pedestals of different amplitudes corresponding to specific brightness levels and bursts of subcarrier wave of specific phase (with respect to the reference color synchronizing burst) superimposed on the reference pedestals. Since the test signal wave thus produced occurs only during the vertical blanking period of the transmitted signal, no undesirable effects are produced upon the television image by the test signal. The make-up of the signal is, however, such that its components are subject to the same distortions as are the components of the standard broadcast signal, whereby performance of the system in these respects may be readily checked and defects remedied, even during broadcast of program material.

Additional objects and advantages of the present invention will become apparent to those skilled in the art from a study of the following detailed description of the accompanying drawings, in which.

Figure 1:
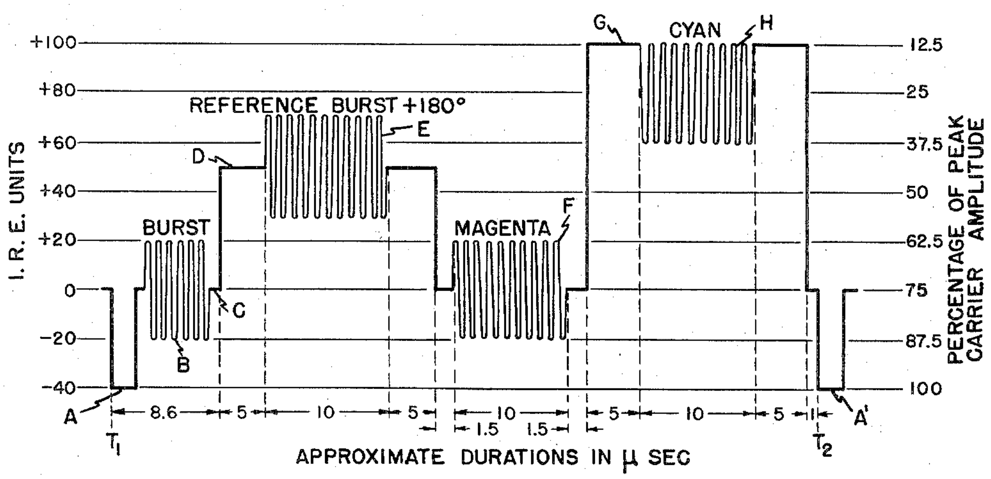
Fig. 1 illustrates a complete television line interval including a test signal in accordance with the present invention.
Figure 6:
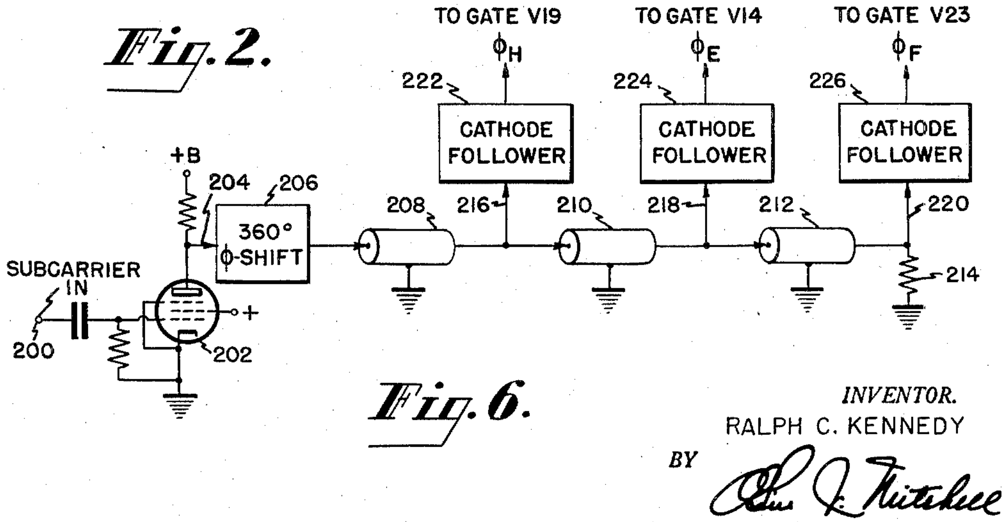
Figure 4A:
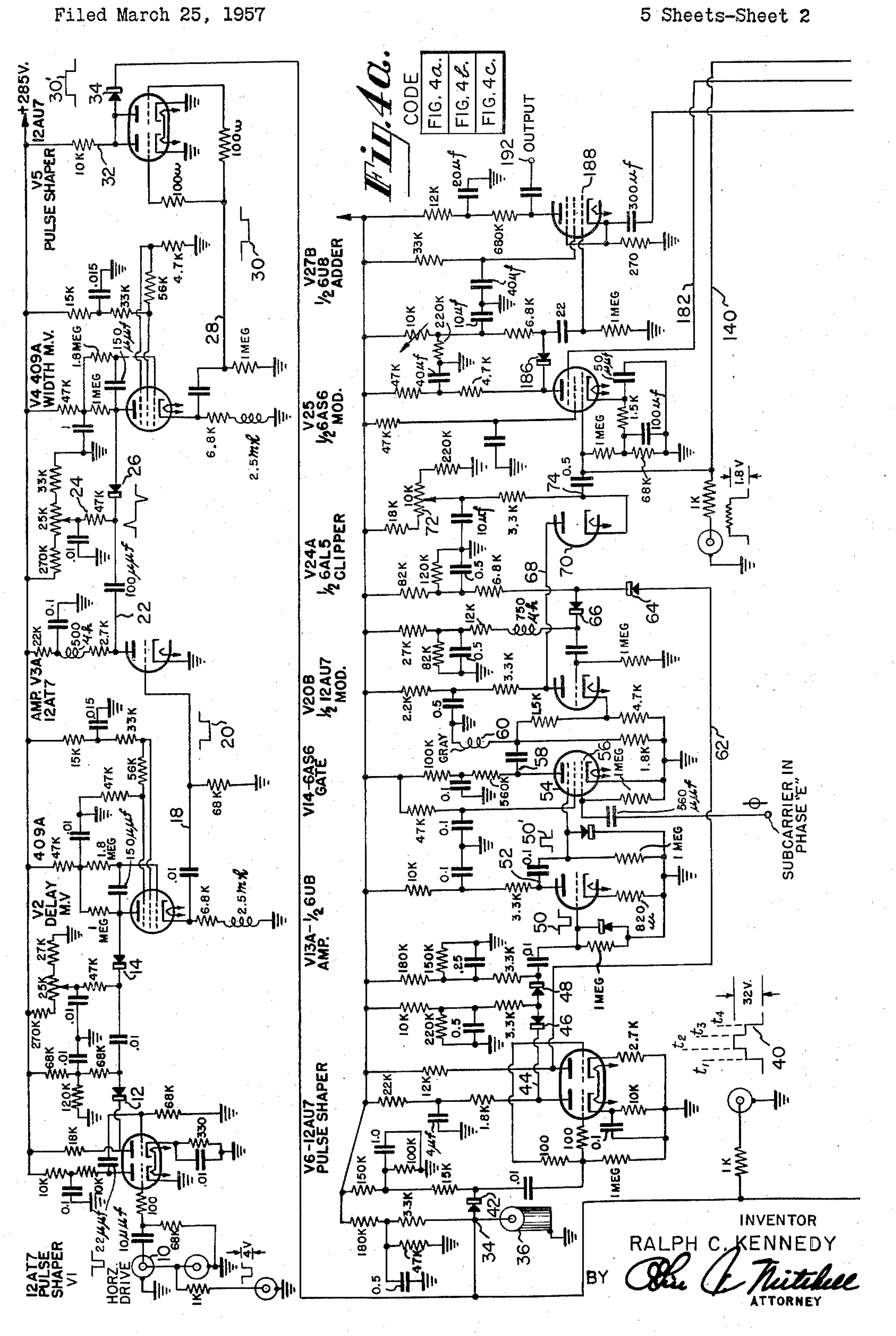
Figure 5:
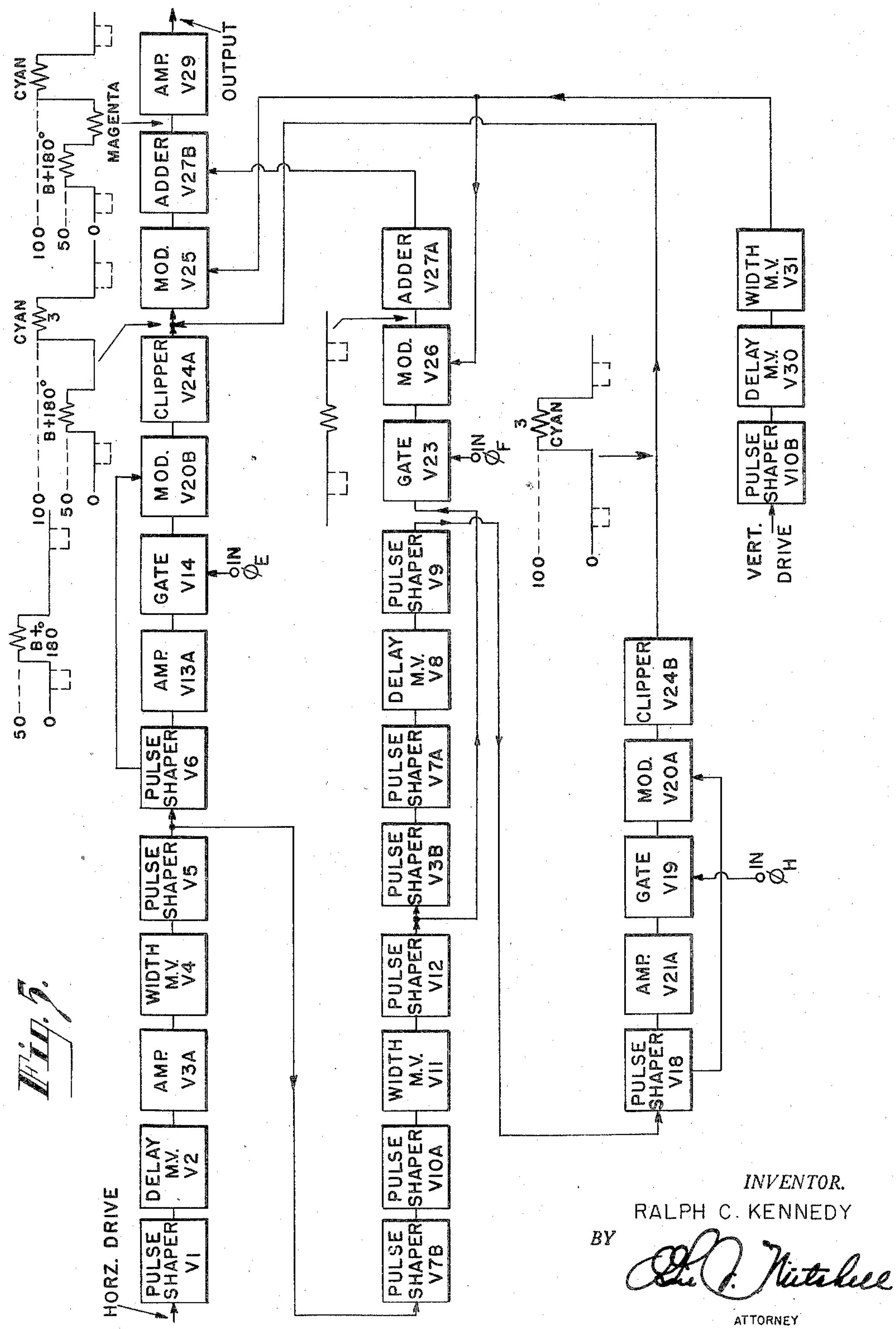

Figs. 4*a*, *b* and *c* constitute, together, a schematic diagram of circuitry capable of producing the test wave shown in Fig. 1;

Fig. 5 is a block diagram corresponding to the schematic diagram of Figs. 4*a*, *b* and *c* and illustrative of the signal flow paths therein; and Fig. 6 illustrates, schematically, circuitry capable of furnishing subcarrier waves to the apparatus of Figs. 4*a*, *b* and *c*.

*Description of Test Signal and Certain of Its Uses*

Fig. 1 illustrates a television line interval including a composite test signal wave produced in accordance with one form of the present invention. The line interval extends from time $T_1$ to time $T_2$. At the beginning of the line interval, there is present a conventional horizon deflection synchronizing pulse A of 40 IRE units, extending in the negative direction. The pulse A is followed by a synchronizing burst B of color subcarrier wave of standard frequency (3.579545 mcs.) and of reference phase. The burst B, having a peak-to-peak amplitude of 40 IRE units, is superimposed upon a blanking pedestal C. The blanking pedestal, burst and horizontal synchronizing pulse form a part of the conventional color television signal and need not be described further.

The remainder of the line interval includes a first pedestal D of 50 IRE units in amplitude and of 20 microseconds duration, commencing approximately 8.6 microseconds after the leading edge of the horizontal sync pulse. The pedestal D corresponds to a brightness or luminance value half-way between zero and maximum, or peak, white (100 IRE units). Superimposed upon the pedestal D is a burst of subcarrier frequency energy of predetermined phase (e. g., reference phase plus 180°) and of 10 microseconds duration, the amplitude of the burst E being 40 IRE units, peak-to-peak. As will be noted, the burst is centered, time-wise, with respect to the pedestal D, so that, for a period of 5 microseconds prior to the burst E and for a period of 5 micro-seconds after that burst, the pedestal D is without amplitude modulation.

After approximately a 1.5 micro-second delay, there is present a second test burst F of 10 micro-seconds duration and of color subcarrier frequency. The burst F, also of 40 IRE units peak-to-peak amplitude, is centered about the zero axis of the signal and is of a phase corresponding to magenta (119.2° displaced from reference burst phase).

After an additional delay of approximately 1.5 micro-seconds, a second pedestal G, having an amplitude of 100 IRE units which corresponds to peak white and of 20 micro-seconds duration is present. Depressed into the pedestal G so that its positive peaks are in alignment with the maximum level of the pedestal is a further test burst H of subcarrier frequency and of cyan phase (103.4° displaced from reference burst), the A. C. axis of the burst H being located along the 80 IRE units level. The test burst H is centered, time-wise, with respect to its associated pedestal G in the same manner as that described in connection with the burst E and pedestal D. After the pedestal H, and a further delay of approximately 1 micro-second, the next horizontal synchronizing pulse A′ occurs, marking the beginning of the next line interval.

Figure 2:
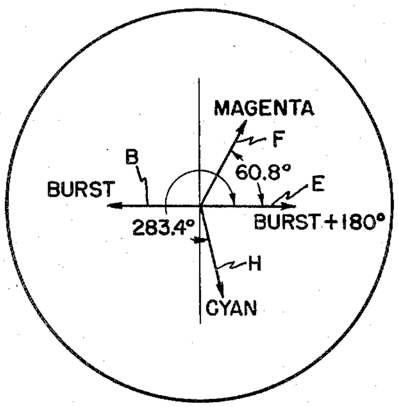
Figure 2 is a vector diagram illustrative of certain phase relations to be described.

The phase relationship of the test bursts E, F and H with respect to the color synchronizing or reference burst B is illustrated by the vector diagram of Figure 2, wherein the vectors are indicated by the same reference characters as those which designate the bursts in Figure 1. The color designations "magenta" and "cyan" correspond to present-day color television signal standards.

In accordance with the present invention, the composite test signal wave is combined with a broadcast television signal of standard variety and is limited to a specific, relatively small portion of the television field period, namely, to several lines during the vertical blanking time of the television cycle. Thus, for example, the test signal may be caused to occur during three successive lines after the second set of equalizing pulses during vertical blanking time, so that the test signal appears, when viewed on a monitor, close to the very top of the monitor image. With the test signal thus limited in time, and in view of conventional field-interlace, approximately six transmitted lines of test signal would appear on a monitor screen for each frame, separated by two lines from the top of the television image. The manner in which the test signal illustrated in Fig. 1 may be produced in accordance with the present invention and combined with a broadcast television signal will be described in detail hereinafter. At this point, however, certain aspects of the test signal itself should be noted.

Stated generally, the present test signal relates the following levels to each other: sync pulses, burst, white level and chrominance. Insofar as the pedestals D and H are concerned, it has been found that the half-amplitude pedestal D closely approximates the A. C. axis of the composite signal and, therefore, suffers a minimum of distortion in transmission, so that the amplitude of the pedestal D may be considered as being exactly half-way between zero and peak white. Since the pedestal G is of twice the amplitude of the pedestal D, any stretching or compressing of white-representative signals in the transmission channel may be readily detected from a comparison of the ratio of the two amplitudes. With the amplitude (50 units) of the pedestal D pre-established, the level of the sync pulses A may also be determined.

Since, as stated, the peak-to-peak amplitude of the test burst E is 40 IRE units, the same as the amplitude of the color reference burst B and the sync amplitude, the burst E also serves to relate the amplitudes of the reference burst and sync pulses. The fact that the test burst E is 180° displaced in phase from the color reference burst B is advantageous in that, when the test signal as is viewed on a vectorscope, the vectors corresponding to the burst E and the burst B should form a straight line (as shown in Fig. 2) when the system is properly adjusted. Also, the test burst E provides a ready reference when the test signal of the present invention is transmitted with a monochrome broadcast signal having no color reference burst.

Since, as has been stated, the amplitudes of the test bursts E, F and H are equal, the test signal is useful in measuring differential gain distortion of the transmission system. That is to say, the signal may, at any point in the system, be passed through a high pass filter, in which event the reference burst B and the three test bursts should be of equal amplitude and lie on the same axis. Any departures from such amplitude-equality and identity of axis would indicate differential gain distortion which would thus be localized to that portion of the system preceding the test point for facilitating adjustment.

Differential phase distortion of a system may also be measured, that is, by applying the test signal to a vectorscope to produce on its screen a vector diagram of the type shown in Fig. 2. Any differentiation of any one of the vectors as to its angular position with respect to the reference burst vector B would be indicative of differential phase distortion, the amount thereof being, in turn, a measure of the degree of such phase distortion.

As has been explained in connection with the wave of Fig. 1, each of the test bursts E, F and H is of 10 micro-seconds duration, a relatively long duration compared to that of the usual synchronizing or reference burst. The reason for such relatively long duration of the test bursts is that band width limitations of the television system may and often do severely distort the synchronizing burst, so that its envelope is of generally "football' shape. Thus, for a large degree of such "footballing" distortion, it may be impossible to determine what the amplitude of the synchronizing burst, as received, should have been. By virtue of the fact that each of the test bursts is approximately four times the duration of the synchronizing burst B, it has been found that several cycles of test burst at the center of each test burst will have the same amplitude, even under conditions of extremely poor band width limitations.

The fact that each of the pedestals D and G is 10 micro-seconds longer in time than the associated test bursts E and H, respectively, is of importance, since compression or clipping of the white level of the signal by the transmission system causes the A. C. axis of the burst to be bowed. By reason of the longer pedestal duration, the amount of bowing may be readily compared with the level of the pedestal.

The rectangular pedestals D and G are also useful in permitting an appraisal of the low frequency transient conditions of the transmission system handling the test signal. That is, the pedestal will show a rounded shape on its leading edge (resulting from integration) or a spike at that location (resulting from differentiation) when the low frequency spectrum of the television signal (15 kcs. to several hundred kcs.) is subjected to phase-versus-frequency distortion. This form of distortion manifests itself, when the signal is viewed on a monitor screen, as a tilt in the pedestal or a "smear" in the image.

Since the test burst F has a phase corresponding to magenta and the burst H corresponds to cyan, both of which are hues to which the eye is quite sensitive, the test signal of the present invention as illustrated in Fig. 1 may be employed for checking color monitors and receivers.

*Addition of test signal to broadcast signal*

Figure 3:
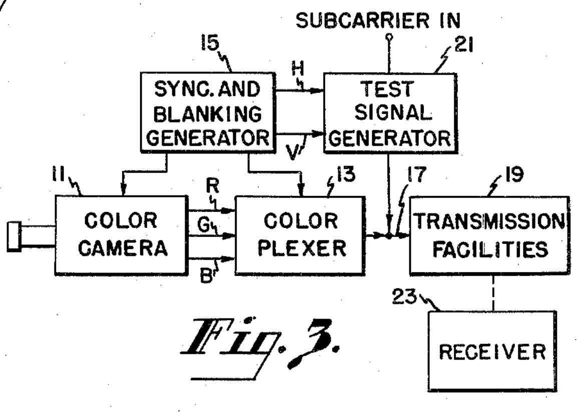
Fig. 3 illustrates, by way of a block diagram, an over-all television system in conjunction with which the present invention may be used.

While the vertical interval test signal of the present invention may, in fact, be inserted in the broadcast communication link at almost any point between the camera and receiver, Fig. 3 illustrates one arrangement which has been successfully employed in transmitting the test signal together with a standard color television broadcast signal. In Fig. 3, there is indicated schematically a conventional color television camera 11 which provides at its output leads simultaneous red (R), green (G) and blue (B) color video signals which are applied to the input terminals of a colorplexer 13. The colorplexer may, for example, be of the type described in an article entitled "The Colorplexer—A Device for Multiplexing Color Television Signals in Accordance with the NTSC Signal Specifications," by Gloystein et al., which appeared in the January 1954 issue of Proceedings of the I. R. E. As explained in the cited article, the colorplexer receives the simultaneous color video signals and synchronizing and blanking signals from a sync generator 15 and produces luminance and chrominance signals through the agency of suitable modulating and matrix circuits. The luminance and chrominance signals thus furnished by the colorplexer are applied via a lead 17 to the transmission facilities represented by the block 19. The test signal generator of the present invention is indicated diagrammatically by a block 21 in Fig. 3 and the output signal of the test signal generator 21 is added to the composite broadcast signal at the input lead 17 of the transmission facilities. It will also be noted from Fig. 3 that the test signal generator receives, at its input terminals, horizontal and vertical drive pulses from the sync generator 15 and a color subcarrier wave. The subcarrier wave may be derived from the same source as that which supplies the subcarrier wave to the colorplexer apparatus in order to insure a locked relation between the test bursts and the color television signal reference burst.

The transmission facilities represented by the block 19 will be understood as including any of the usual signal conveying links normally employed in commercial broadcast systems. Completing the illustration of the system is a receiver 23 which serves to reproduce the televised image from the composite signal applied to its input terminals via the transmission facilities and on whose image display device will appear the several lines of test information produced by the generator of the present invention, as described supra.

*Overall description of test signal generating apparatus*

Figure 4B:
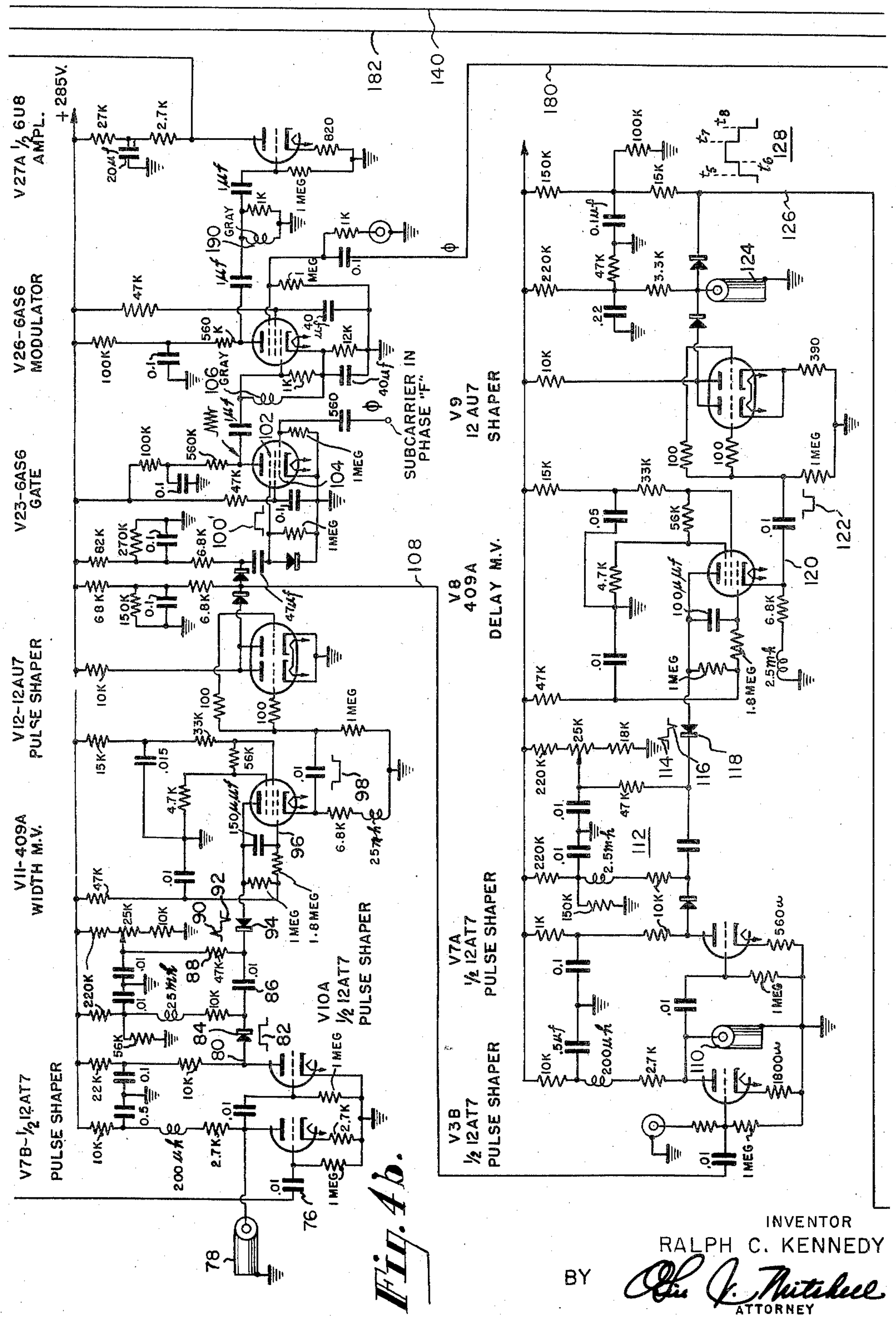
Figure 4C:
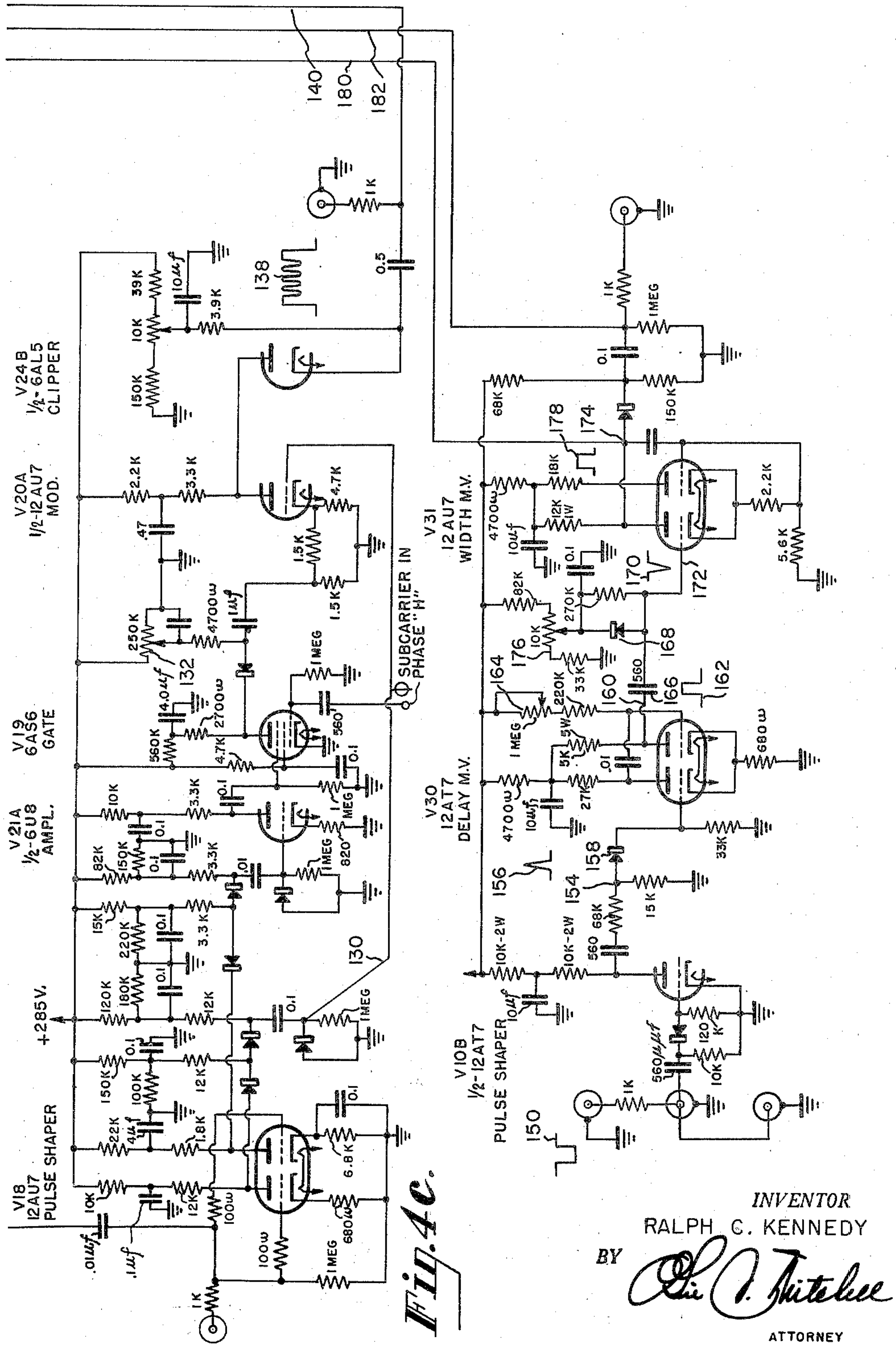

A test signal of the type described may be produced by means of the following described apparatus in accordance with the present invention, illustrated in Figs. 4*a*–*c*. The horizontal drive pulses from the standard sync pulse generator 15 and of negative polarity are applied to input terminal 10 in Fig. 4*a*. The pulses are successively differentiated and amplified in the two sections of the tube V1 to provide alternate negative- and positive-going spikes corresponding to their leading and trailing edges, respectively. The negative spikes are applied via diodes 12 and 14 to trigger a multivibrator V2 which is of conventional form, comprising a phantastron circuit which provides at its output lead 18 a negative pulse 20 whose leading edge corresponds in time to the leading edge of the horizontal drive pulse. The duration of the pulse 20 is 8.6 micro-seconds. This pulse is amplified and inverted in a tube V3A and differentiated via a capacitor 22 and resistor 24 to produce alternate positive- and negative-going spikes corresponding to the leading and trailing edges of the pulse. The negative-going spike is coupled via a diode 26 as a trigger pulse to a "width multivibrator" V4 which is also of the phantastron type. The multivibrator V4 provides at its output lead 28 a negative-going pulse 30 whose leading edge corresponds to the trailing edge of the pulse 20 and whose trailing edge occurs 15 micro-seconds later.

The pulse 30 is amplified in an amplifier V5 which provides at its output terminal 32 a positive-going version 30′ of the pulse 30. A series diode 34 serves to clip the negative portion of the amplified pulse 30′ to provide a "clean" base line. The clipped pulse 30′ is applied to one end of an open-circuited delay line 36. The leading edge of the pulse 30′ is delayed by the line 36 by a total of 5 micro-seconds. The delay line is of such length as to have a delay of 2.5 micro-seconds. Since the pulse is reflected by the open end of the delay line, the reflected component is delayed by a total of 2×2.5 or 5 micro-seconds. The trailing edge of the pulse 30′ is, after reflection by the open ended delay line, delayed 5 micro-seconds also, so that, at the terminal 38, there appears a wave such as that shown by waveform 40 in which time $t_1$ corresponds to the leading edge of the pulse 30′, time $t_2$ corresponds to the delayed leading edge of the pulse 30′, time $t_3$ corresponds to the trailing edge of the pulse 30′ and time $t_4$ corresponds to the delayed trailing edge of the pulse 30′.

The composite wave 40 is applied via a base line clipping diode 42 to a pair of amplifiers V6A and V6B. The amplifier V6A provides, at its output terminal 44, a negative version of the wave 40. A pair of serially connected clipping diodes 46 and 48 serve to remove the narrow portion of the composite pulse so that a pulse 50 corresponding in time to the portion of the wave 40 between times $t_2$ and $t_3$ is applied to the control grid of an amplifier V13A which provides at its output terminal 52 a positive-going pulse 50′. The pulse 50′ is applied to the suppressor grid 54 of a burst gate tube V14 which also receives on its control electrode 56 a continuous wave of subcarrier energy of phase burst plus 180° (phase E, Fig. 2). The gate tube V14 is so biased that, for the duration of the pulse 50′, it provides at its output terminal 58 a burst of subcarrier energy and of 10 micro-seconds duration corresponding to the first-mentioned burst of the composite test signal. A suitable source of subcarrier wave for the gate tube V14 will be described in detail hereinafter.

The output burst from the gating tube V14 is filtered by means of a tuned inductance 60 so that the gating pulse is removed therefrom. The resultant burst, centered about its A. C. axis, is applied to the cathode of a modulator tube V20B. The composite wave 40, applied to the control grid of the amplifier V6B, results in the production at the lead 62 of generally a negative version of the wave 40. By virtue of the action of a pair of serially connected clipping diodes 64 and 66, only the wider portion of the composite wave 40 (i. e., that portion of the wave extending from time $t_1$ to $t_4$) is applied to the control grid of the modulator tube V20B. That tube provides at its output lead 68 a composite wave corresponding to the first pedestal of Fig. 1 with a burst of 10 micro-seconds duration and of phase burst plus 180° superimposed thereon. This composite wave is clipped by a series diode 70 to provide a clean base line therefor. The diode 70 is so biased by means of a potentiometer 72 as to insure the proper amplitude of the pulse at the terminal 74 required for the 50 9RE unit pedestal shown in Fig. 1. The wave from the terminal is applied to the control grid of a modulator or adder tube V25.

The composite pulse wave 40 produced by the action of the delay line 36 is also applied via a coupling capacitor 76 to the control grid of a pulse shaper tube V7B (Fig. 4*b*) which includes in its anode circuit a second, open-circuited delay line 78. The effect of the delay line 78 is that of delaying each of the edges of the wave 40 by approximately 1.5 micro-seconds. The resultant wave is applied to the control grid of a pulse shaper tube V10A which provides at its output lead 80 a generally rectangular, positive-going pulse whose leading edge corresponds to the leading edge of the wave 40 and whose trailing edge occurs 1.5 micro-seconds after the trailing edge of the pulse 40. This pulse, indicated by the pulse 82 in the drawing, is clipped by a diode 84 and is differentiated by means of a series capacitor 86 and shunt resistor 88 to provide alternate positive- and negative-going spikes 90 and 92, respectively. The negative spike 92 is passed by a coupling diode 94 to the trigger input terminal 96 of a width multivibrator V11 which comprises a conventional phantastron circuit. The multivibrator V11 provides at its cathode output lead a negative pulse 98 whose leading edge corresponds to the spike 92 and whose trailing edge occurs 10 micro-seconds later. The pulse 98 is amplified and shaped in a pulse shaper circuit comprising the double triode V12. The resultant positive-going pulse 100 of 10 micro-seconds duration is applied to the suppressor grid 102 of a second gate tube V23 which receives on its control grid 104 a continuous wave of color subcarrier energy and of magenta phase (i. e., 119.2° displaced from burst, as shown by vector F in Fig. 2), so that the output signal of the gate V23 is a burst of subcarrier energy of magenta phase and of 10 micro-seconds' duration, occurring in time as shown by the burst thus designated in Fig. 1. A tuned inductance 106 serves to remove the gating pulse from the burst provided by the tube V23 in the same manner as that described in connection with the gate V14 supra. The resultant burst, centered about its A. C. axis, is applied to the control grid of a modulator tube V26 whose function will be described hereinafter.

A pulse corresponding to the pulse 100 at the output of the pulse shaper tube V12 is also applied via a lead 108 to the control grid of a pulse shaper tube V3B which includes in its anode circuit an open-circuited delay line 110. The effect of the delay line 110 is that of delaying each of the edges of the pulse 100 by approximately 1.5 micro-seconds. The output of the delay line 110 is, in turn, applied to the control grid of a pulse shaper tube V7A. The resultant pulse is clipped and differentiated by the circuitry designated generally by reference numeral 112 to provide alternate positive- and negative-going spikes 114 and 116, respectively, in a manner similar to that described in connection with the circuitry following the pulse shaper V10A. The negative spike 116, corresponding in time to 1.5 micro-seconds following the termination of the magenta-phased burst in Fig. 1, is applied via a coupling diode 118 to the input terminal of a phantastron type delay multivibrator V8. The multivibrator V8 provides at its output lead 120 a negative-going pulse 122 of 15 micro-seconds duration commencing in time approximately 1.5 micro-seconds after the termination of the magenta-phased burst.

The pulse 122 is applied to a pulse shaper circuit including the tube V9 and an open-circuited delay line 124 which operates in a manner similar to that described in connection with the delay line 36, in that it delays each of the edges of the pulse 122 by approximately 5 micro-seconds. The resultant wave at the output lead 126 is as shown by the waveform 128 and comprises a narrow pulse superimposed on a pulse of longer duration. The leading edge of the pulse 128 occurs at time $t_5$, corresponding to approximately 1.5 micro-seconds following the magenta-phased burst; the edge $t_6$ occurs 5 micro-seconds later; the edge $t_7$ occurs 10 micro-seconds after the edge $t_6$ and the trailing edge of the composite pulse occurs at time $t_8$, 5 micro-seconds following the time $t_7$.

The wave 128 is successively shaped and amplified by the circuits including the tubes V18 and V21A (Fig. 4*c*), in the same manner as that in which the wave 40 was acted upon by the circuits V6 and V13A, supra. A positive-going gating pulse occurring between the times $t_6$ and $t_7$ is thus applied to the suppressor grid of the gate tube V19 which receives on its control grid a continuous wave of subcarrier energy of cyan phase (i. e., 103.4° displaced from burst), so that the output signal of the gate tube V19 is a burst of wave of cyan phase and of 10 micro-seconds duration superimposed on a gating pedestal.

As in the manner described in connection with the pedestal pulse applied to the control grid of the modulator tube V20B, a similar pedestal pulse of greater amplitude is provided by the pulse shaper tube V18 and applied via a lead 130 to the control grid of a modulator tube V20A which also receives on its cathode the pedestaled burst from the gate tube V19. The amplitude of the pedestal upon which the cyan burst is superimposed is controlled by means of a potentiometer 132 which operates to control the biasing of a pedestal clipping diode 134 interposed between the gate tube V19 and the cathode of the modulator tube V20A. That is, the potentiometer 132 is adjusted so that the amplitude of the pedestal upon which the cyan burst is superimposed is sufficient to depress the cyan burst into the pedestal produced at the anode of the modulator tube V20A. That is to say, the cyan burst is depressed into the pedestal so that the positive-going peaks of the burst are aligned with the maximum amplitude of the pedestal in question. The pedestaled cyan burst is applied to a series clipper diode 136 which serves to control the amplitude of the pedestal in such manner that the ultimate pedestal has an amplitude of 100 IRE units. This final pedestal with the depressed cyan burst is represented by the wave 138 at the output of the clipper 136. The wave 138 is applied to the control grid of the modulator tube V25 via a lead 140, so that it is added in the modulator tube V25 with the first-described pedestal and its associated burst.

As thus far described, the test signal generating apparatus produces the 50-unit and 100-unit pedestals and their associated burst as well as the magenta-phased burst every television line interval. In order that the test wave may be confined to selected lines of the television field interval, the following additional apparatus is provided: Negative-going vertical frequency drive pulses 150 are applied to the input terminal 152 of a pulse shaper circuit V10B which serves, by differentiation and clipping, to provide at the terminal 154, a positive-going trigger spike 156 which occurs in time in general coincidence with the leading edge of the initial vertical drive pulse. The spike 156 is applied via a coupling diode 158 to trigger a delay multivibrator V30 which is of conventional form. The multivibrator V30 provides, at its output lead 160, a positive-going pulse 162, the duration of which is adjustable by means of an adjustable timing resistor 164. The duration of the pulse 162 may, therefore, be adjusted so that the trailing edge of the pulse is caused to occur at a predetermined time prior to the commencement of the succeeding television field scanning interval. For example, the pulse 162 may be made of such duration that its trailing edge corresponds to a point in time approximately 4 television line intervals prior to the end of the vertical blanking interval of the system into which the test signal of the present invention is introduced.

The pulse 162 is successively differentiated by means of a capacitor 166 and associated resistance and clipped by a diode 168 to apply a negative-going spike 170 (corresponding to the trailing edge of the pulse 162) to the input terminal 172 of a width multivibrator V31, also of conventional form. The width multivibrator provides at its output terminal 174 a pulse of duration equal to several television line intervals. For example, if it is desired that the test signal of the invention occur during three television line intervals of a field period, the width multivibrator V31 may be adjusted by means of its associated potentiometer 176 to provide a positive-going pulse 178 of 190.5 micro-seconds (or 3 line intervals).

The pulse 178 is applied via a lead 180 to the suppressor grid of the modulator tube V26, thereby gating that tube into conduction for its duration. A pulse corresponding to the pulse 178 is applied via the lead 182 to the suppressor grid of the modulator tube V25, thereby gating that tube into conduction for the same period. Since, as has been explained, the modulator tube V25 receives on its control grid the 50-unit pedestal with its associated burst and the 100-unit pedestal with its burst, gating of the tube V25 produces for the selected number of lines during each vertical blanking interval the two pedestals in question and their associated bursts. Similarly, gating of the modulator tube V26 passes the magenta burst during the same lines as those in which the modulator tube V25 is actuated.

The gated 50- and 100-unit pedestals with associated bursts are applied via a base line clipping diode 186 to the control grid 188 of an adder tube V27B. The field-rate-gated magenta bursts from the modulator tube V26 are reduced to their A. C. axis via a tuned inductance filter 190, amplified in a conventional stage V27A and applied to the cathode of the adder tube V27B. The composite test signal wave is, therefore, available at the output terminal 192 at the anode of the adder tube V27B.

It will be understood that the output wave is one such as that illustrated in Fig. 1, but occurring for a selected number (e. g., 3) of television line intervals at a specified time during the vertical blanking period of the system into which the test signal is introduced.

In order to facilitate an understanding of the overall layout of the specific circuitry shown schematically in Figs. 4(*a*), (*b*) and (*c*), Fig. 5 illustrates the apparatus of Figs. 4(*a*)–(*c*) by way of a block diagram, wherein the tube designations (e. g., V1, V2, etc.) correspond to those employed in the schematic diagram, as do the functional designations of the various tubes and associated circuits. In view of the foregoing detailed description of the circuits, however, further description of the block diagram of Fig. 5 is unnecessary.

As described, the gates V14, V23 and V19 receive, respectively, continuous waves of subcarrier frequency of phases "E," "F" and "H." A specific circuit capable of furnishing such waves of subcarrier energy to the gates is illustrated in Fig. 6. A wave of subcarrier energy produced by any suitable means such as the usual subcarrier frequency oscillator in the colorplexer circuit is applied to the input terminal 200 of a conventional amplifier tube 202 which provides, at its output terminal 204, an amplified version of the subcarrier wave. The amplified wave is passed through a conventional adjustable phase shift circuit 206 for initial adjustment of the phase of the subcarrier and is then applied to a series of lengths of delay line 208, 210 and 212 which are terminated by an impedance 214. The delay line sections 208, 210 and 212 are, respectively, of the proper lengths to delay the input signal by the amounts required to provide at their output terminals 216, 218 and 220, subcarrier waves of phases H, E and F. These waves are, in turn, applied by cathode followers 222, 224, and 226 to the gate circuits V19, V14 and V23, respectively. Since the use of delay line sections for shifting the phase of a subcarrier wave is well known in the art, further description of the circuitry of Fig. 6 is unnecessary. It should, however, be understood that, in place of delay lines such as those illustrated, other forms of delay devices such as electron tube phase shifters may be employed.

While apparatus has been described herein for producing a test signal wave in accordance with a specific form of the present invention, it will be recognized that various modifications may be made. For example, while it is considered advantageous to locate the reference pedestals at the beginning and end of the line interval, respectively, since such a signal is less likely to produce halation on the screen of a monitor at its top center, it will be recognized that the location of one or both of the pedestals may be changed to suit different requirements. Also, it will be recognized that the specific phases of test bursts included in the signal may also be varied from those illustrated herein.

Having thus described my invention, what I claim as new and desire to secure by Letters Patent is:

1. Color television test apparatus for use in testing a system of the type which processes a composite signal including a phase- and amplitude-modulated molor subcarrier wave, a luminance component, line- and field-deflection synchronizing and blanking components and a color subcarrier synchronizing burst of reference phase, said apparatus comprising: means for producing, during a television line interval, a first pedestal of voltage of predetermined amplitude and a second pedestal of voltage of pretermined amplitude different from said first amplitude, means for producing a burst of subcarrier wave of fixed phase with respect to such reference phase, means for adding said pedestals and said burst to produce a test wave, and means for limiting the occurrence of said test wave to the field blanking interval of such composite signal.

2. Color television test apparatus for use in testing a system of the type which processes a composite signal including a phase- and amplitude-modulated color subcarrier wave, a luminance component, line- and field-deflection synchronizing and blanking components and a color subcarrier synchronizing burst of reference phase, said apparatus comprising: means for producing, during a television line interval, a first pedestal of voltage of predetermined amplitude and a second pedestal of voltage af predetermined amplitude different from said first amplitude, means for producing a burst of subcarrier wave of fixed phase with respect to such reference phase and occurring during the occurrence of one of said pedestals, means for adding said pedestals and said burst to produce a test wave in which said produced burst is superimposed on a pedestal, and means for limiting the occurrence of said test wave to the field blanking interval of such composite signal.

3. The invention as defined by claim 2 including means for producing a second burst of subcarrier wave of fixed phase with respect to said reference phase but of different phase from said first produced burst and means for adding said second burst to said pedestals and burst.

4. The invention as defined by claim 2 including means for producing a second burst of subcarrier wave of fixed phase with respect to said reference phase and occurring during the occurrence of the other of said pedestals and means for combining said second burst with said test wave.

5. The invention as defined by claim 2 wherein said last-named means comprises gating circuitry operative in synchronism with said field-deflection synchronizing components for passing said test wave only during each field blanking interval.

6. The invention as defined by claim 2 comprising an output circuit and wherein said last-named means comprises normally closed gate means interposed between said adding means and said output circuit and means for applying a gate-opening pulse to said gate means during each field blanking interval.

7. Color television test apparatus for use in testing a system of the type which processes a composite signal including a phase-and amplitude-modulated color subcarrier wave, a luminance component, line- and field-deflection synchronizing and blanking components and a color subcarrier synchronizing burst of reference phase, said apparatus comprising: means responsive to such line synchronizing component for producing, during a television line interval, a first pedestal of voltage of predetermined amplitude and a second pedestal of voltage of predetermined amplitude different from said first amplitude, means responsive to such line synchronizing component for producing during a television line interval a burst of subcarrier wave of fixed phase with respect to such reference phase, means for adding said pedestals and said burst to produce a test wave, and means for limiting the occurrence of said test wave to the field blanking interval of such composite signal.

8. The invention as defined by claim 7 wherein said last-named means comprises a normally closed gate circuit, means for applying said test wave to said gate circuit, and means operative in synchronism with said field deflection synchronizing component for opening said gate circuit during at least a portion of each such field-blanking interval.

No references cited.